US011475383B2

(12) United States Patent
Yang et al.

(10) Patent No.: US 11,475,383 B2
(45) Date of Patent: Oct. 18, 2022

(54) OPERATION DEFENSE METHOD AND DEVICE, APPARATUS, AND COMPUTER-READABLE STORAGE MEDIUM

(71) Applicant: Beijing Baidu Netcom Science and Technology Co., Ltd., Beijing (CN)

(72) Inventors: Tao Yang, Beijing (CN); Xiang Gao, Beijing (CN); Shiyao Sun, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 263 days.

(21) Appl. No.: 16/447,248

(22) Filed: Jun. 20, 2019

(65) Prior Publication Data

US 2020/0019904 A1    Jan. 16, 2020

(30) Foreign Application Priority Data

Jul. 16, 2018 (CN) .......................... 201810778984.4

(51) Int. Cl.
*G06Q 10/00*     (2012.01)
*G06F 9/00*      (2006.01)
(Continued)

(52) U.S. Cl.
CPC ......... *G06Q 10/0635* (2013.01); *G06F 9/547* (2013.01); *G06Q 10/0633* (2013.01)

(58) Field of Classification Search
CPC .......................................... G06Q 10/00–50/00
(Continued)

(56) References Cited

U.S. PATENT DOCUMENTS

| 10,417,638 | B2 * | 9/2019 | Pitz ....................... G06Q 20/32 |
| 2015/0039381 | A1 * | 2/2015 | Coronel ............ G06Q 10/0633 |
| | | | 705/7.27 |

(Continued)

FOREIGN PATENT DOCUMENTS

| CN | 101662773 A | 3/2008 |
| CN | 103853986 A | 6/2014 |

(Continued)

OTHER PUBLICATIONS

Chinese Second Office Action, Chinese Application No. 201810778984.4, dated May 26, 2020, 16 pages.
(Continued)

*Primary Examiner* — Mustafa Iqbal
(74) *Attorney, Agent, or Firm* — Patterson Thuente Pedersen, P.A.

(57) ABSTRACT

An operation defense method and device, apparatus and computer-readable storage medium are provided. The method includes: receiving an operation request from a business system through a shared interface; according to a parameter carried in the operation request, selecting at least one risk evaluation algorithm for the operation request from an algorithm rule library shared by a plurality of service systems; performing risk evaluation to the operation request with the selected risk evaluation algorithm; and according to a risk evaluation result, determining to allow the operation request. In the present application, a centralized operation defense mechanism is used to analyze the operation requests from different service systems and to select an appropriate risk evaluation algorithm to calculate the risk coefficient of each operation request, so that an operation with a high risk can be prevented, and a diffusion range of an abnormality can be reduced.

11 Claims, 7 Drawing Sheets

(51) Int. Cl.
  *G06Q 10/06* (2012.01)
  *G06F 9/54* (2006.01)
(58) Field of Classification Search
  USPC .............................................. 705/7.11–7.42
  See application file for complete search history.

(56) References Cited

U.S. PATENT DOCUMENTS

| | | | | |
|---|---|---|---|---|
| 2018/0074483 | A1* | 3/2018 | Cruz | G05B 23/0283 |
| 2018/0181900 | A1* | 6/2018 | Huggins | G06F 21/64 |
| 2018/0260558 | A1* | 9/2018 | Li | H04L 63/1433 |
| 2020/0410415 | A1* | 12/2020 | Harris | G06Q 10/0635 |

FOREIGN PATENT DOCUMENTS

| | | |
|---|---|---|
| CN | 103973782 A | 8/2014 |
| CN | 106656932 A | 5/2017 |
| CN | 106685894 A | 5/2017 |
| CN | 107239882 A | 10/2017 |
| CN | 107483500 A | 12/2017 |
| CN | 107645482 A | 1/2018 |
| CN | 107979573 A | 5/2018 |
| CN | 108196879 A | 6/2018 |

OTHER PUBLICATIONS

Search Report, Chinese Application No. 2017107789844, dated May 18, 2020, 4 pages.
Chinese Third Office Action, Chinese Application No. 2018107789844, dated Oct. 10, 2020, 8 pages.
Search Report, Chinese Application No. 2018107789844, dated Sep. 24, 2020, 4 pages.
First Office Action; Application No. CN 201810778984.4, dated Dec. 2, 2019, 15 pages.
Search Report, Application No. CN 2018107789844, dated Nov. 23, 2019, 5 pages.

* cited by examiner

OPERATION DEFENSE METHOD AND DEVICE, APPARATUS, AND COMPUTER-READABLE STORAGE MEDIUM

CROSS-REFERENCE TO RELATED APPLICATION

This application claims priority to Chinese Patent Application No. 201810778984.4, entitled "Operation Defense Method and Device, Apparatus, and Computer-Readable Storage Medium", and filed on Jul. 16, 2018, which is hereby incorporated by reference in its entirety.

TECHNICAL FIELD

The present application relates to a field of business security, and in particular, to an operation defense method and device, apparatus and computer-readable storage medium.

BACKGROUND

In recent years, with increased numbers of machines and service scopes, infrastructure systems that span multiple regions, and machine rooms or data centers, multiple tenants and complex businesses have been formed. In these complex systems, the number of machines can be on the order of millions, and an the number of instances can be on the order of hundreds of millions. Various businesses are constantly troubled by anomalies, such as unanticipated automatic changes, manual misoperations and bugs (loopholes) in a new program when brought online.

In order to prevent risks caused by misoperations in existing defensive mechanisms, defensive rules are configured and developed manually, mainly after problems are detected by humans. However, all of the defense rules need to be reconfigured when a new business or a new system is added. In addition, the existing defense mechanisms are not identical, but are separately configured in different business systems.

As a result, existing defense mechanisms may have a variety of shortcomings including:

1. Each operation system is configured separately, resulting in high labor costs.
2. Separate redevelopment of defense mechanisms is needed for newly added business systems, which is duplication of effort.
3. Where defense mechanisms need to be modified, all of the systems need to be modified synchronously, so that the maintenance cost is high.
4. The configuration of a manual defense mechanism relies on the experience of the personnel and the attention paid by the personnel to the defense, so that the experience cannot be accumulated, and the coverage and efficiency of the defense mechanism cannot be ensured.

SUMMARY

An operation defense method and device, apparatus and computer-readable storage medium are provided according to embodiments of the present application, so as to at least solve the above technical problems in the existing technology.

According to a first aspect, a method for operation defense can include receiving an operation request from a business system through a shared interface, according to a parameter carried in the operation request, selecting at least one risk evaluation algorithm for the operation request from an algorithm rule library shared by a plurality of service systems, performing risk evaluation to the operation request with the selected risk evaluation algorithm, and according to a risk evaluation result, determining to allow the operation request.

In conjunction with the first aspect, in a first implementation of the first aspect of the present application, the receiving an operation request from a business system through a shared interface can includes calling an application programming interface of the business system to receive the operation request, the operation request comprising of one or more of an operation object, an identity of an operation initiator, and an operation parameter.

In conjunction with the first implementation of the first aspect, in a second implementation of the first aspect of the present application, selecting at least one risk evaluation algorithm for the operation request from an algorithm rule library shared by a plurality of service systems can includes selecting at least one risk evaluation algorithm from the risk evaluation algorithm rule library, according to one or more of the operation objects, the identity of the operation initiator, and the operation parameter of the operation request, and in combination with a status of the operation object in the operation request and an operation history of the operation object.

In conjunction with any one of the first aspect, the first implementation of the first aspect, and the second implementation of the first aspect, in a third implementation of the first aspect of the present application, the risk evaluation algorithm can comprise one or more of an authority evaluation algorithm, a block evaluation algorithm, a quota evaluation algorithm, a speed-limit evaluation algorithm, a service level objection evaluation algorithm, wherein different operation objects corresponds different risk evaluation algorithms.

In conjunction with the first aspect, in a fourth implementation of the first aspect of the present application, determining to allow the operation request can includes when a plurality of risk evaluation algorithms are selected for the operation request, performing a weighted calculation according to weights and risk evaluation results of the plurality of risk evaluation algorithms to determine; allow the operation request; and when the risk evaluation result indicates that the operation request is not allowed, returning a reason for not allowing the operation request.

According to a second aspect, a device for operation defense can include a receiving module, configured to receive an operation request from a business system through a shared interface, an algorithm selecting module configured to, according to a parameter carried in the operation request, select at least one risk evaluation algorithm for the operation request from an algorithm rule library shared by a plurality of service systems, a risk evaluating module, configured to perform risk evaluation to the operation request with the selected risk evaluation algorithm, and an operation determining module, configured to, according to a risk evaluation result, determine to allow the operation request.

In conjunction with the second aspect, in a first implementation of the second aspect of the present application, the receiving module can include a calling sub-module, configured to call an application programming interface of the business system to receive the operation request, the operation request comprising one or more of an operation object, an identity of an operation initiator, and an operation parameter.

In conjunction with the first implementation of the second aspect, in a second implementation of the second aspect of the present application, the algorithm selecting module can be configured to select at least one risk evaluation algorithm from the risk evaluation algorithm rule library, according to one or more of the operation objects, the identity of the operation initiator, and the operation parameter of the operation request, and in combination with a status of the operation object in the operation request and an operation history of the operation object.

In conjunction with any one of the second aspect, the first implementation of the second aspect, and the second implementation of the second aspect, in a third implementation of the second aspect of the present application, the risk evaluation algorithm includes one or more of an authority evaluation algorithm, a block evaluation algorithm, a quota evaluation algorithm, a speed-limit evaluation algorithm, a service level objection evaluation algorithm, wherein different operation objects corresponds different risk evaluation algorithms.

In conjunction with the second aspect, in a fourth implementation of the second aspect of the present application, the operation determining module can include a result calculating sub-module configured to, in a case that a plurality of risk evaluation algorithms are selected for the operation request, perform a weighted calculation according to weights and risk evaluation results of the plurality of risk evaluation algorithms, to determine allow the operation request, and a reason returning sub-module, configured to, in a case that the risk evaluation result indicates that the operation request is not allowed, return a reason for not allowing the operation request.

The functions of the devices may be implemented by hardware, or by hardware executing corresponding software. The hardware or software includes one or more modules corresponding to the above functions.

In a third aspect in a possible design, the operation defense apparatus can include a processor and a storage, the storage is configured to store a program for supporting the above operation defense method executed by the operation defense device, the processor is configured to execute the program stored in the storage. The operation defense apparatus further can include a communication interface configured for communication between the operation defense apparatus and another apparatus or communication network.

In a fourth aspect, a computer-readable storage medium is provided for storing computer software instructions used by the operation defense device, the computer software instructions can include programs involved in execution of the above operation defense method.

In the embodiment of the present application, a centralized operation defense mechanism is used to analyze operation requests from different service systems and to select an appropriate risk evaluation algorithm to calculate the risk coefficient of each operation request, so that a high-risk operation can be prevented, and a diffusion range of an abnormality can be reduced, ensuring high availability and stability of a service can be ensured.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

Figure 1:
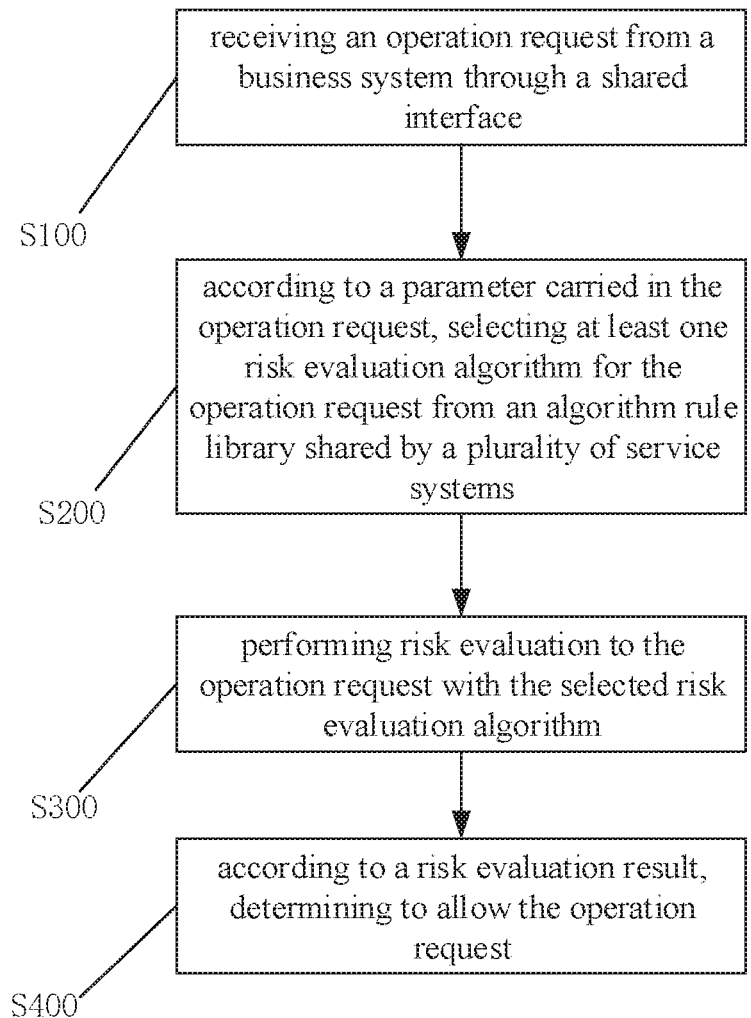
FIG. 1 is a flowchart depicting an operation defense method according to an embodiment of the present application.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

An operation defense method and device are provided according to the present application. A processing flow and principles of the operation defense method and device of embodiments of the present disclosure are described in detail below.

FIG. 1 is a flowchart depicting an operation defense method according to an embodiment of the present application. At S100, an operation request can be received from a business system through a shared interface.

In an embodiment, multiple business systems may be connected simultaneously with a central operation evaluation system. The central operation evaluation system can be provided with a shared interface, and each service system can be provided with an interface, respectively. The central operation evaluation system can be connected with respective interfaces of respective business systems through the shared interface to receive an operation request uploaded by each business system, and then to return an evaluation result. Activities at S100 can include: calling an API (Application Programming Interface) of the business system to receive the operation request. In a case of a plurality of business systems, the APIs of the business systems can be called respectively and then respective operation requests can be input through the respective APIs. The types of operation request can include a releases or a change operations programs, configurations or data; machine-related operations (such as install, reinstall, restart, initialization, or uninstall); instance-related operations (such as creation, update, destruction, or migration and recreation); service-related operations (such as start, stop, expansion, or shrinkage); and business-related operations (such as blocking, downgrading, or setting of entry-and-exit security modes).

The operation requests of each type can include one or more of an operation object, an operation initiator, and an operation parameter. For example, an operation object may be a specific operation object such as a physical machine, a virtual machine, an instance, or a domain name. The operation initiator may be an operator with a respective permission, such as an administrator, a common user, or the like. The operation parameter may be a value of a parameter related to an operation, such as the value of a transmission speed or a memory capacity.

At S200, according to a parameter carried in the operation request, at least one risk evaluation algorithm for the operation request can be selected from an algorithm rule library shared by a plurality of service systems.

In an implementation, S200 may include: selecting at least one risk evaluation algorithm from the risk evaluation algorithm rule library, according to one or more of the operation object, the identity of the operation initiator, and the operation parameter of the operation request, and in combination with a status of the operation object in the operation request and an operation history of the operation object. The risk evaluation algorithm may include one or more of an authority evaluation algorithm, a block evaluation algorithm, a quota evaluation algorithm, a speed-limit evaluation algorithm, or an SLO (Service Level Objection) evaluation algorithm, wherein different operation objects can correspond to different risk evaluation algorithms.

According to information in operation requests, an appropriate evaluation algorithm may be applied. For example, when the operation request includes an identity of an operation initiator, the authority evaluation algorithm may be applied. When the operation request includes the operation object, the evaluation algorithm corresponding to the operation object may be selected, such as an operation evaluation algorithm for a physical machine, an operation evaluation algorithm for a virtual machine, an operation evaluation algorithm for an instance, an operation evaluation algorithm for a domain name, or the like. When that the operation request includes the operation parameter, the blocking evaluation algorithm, the quota evaluation algorithm, the speed-limiting evaluation algorithm, the SLO evaluation algorithm and the like may be applied. In addition, the selecting may also be performed in combination with the current operation object and an operation history thereof. For example, in a case that the current operation object is a virtual machine, a status of the current virtual machine and a previous operation history of the virtual machine may be acquired. For example, a corresponding evaluation algorithm may be acquired based on whether the current virtual machine is running normally, whether there was an abnormal operation previously, and the like.

At S300 risk evaluation of the operation request can be performed with the selected risk evaluation algorithm.

After selecting the evaluation algorithm, a corresponding calculation can be performed with the selected risk evaluation algorithm, such that a corresponding result of the calculation is acquired. In an implementation, this result may be represented by a probability value. For example, 0 can indicate completely risk-free and 100% can indicate an absolute, or certain, risk. In addition, when one risk evaluation algorithm is selected according to the operation request, a result of this risk evaluation obtained with the risk evaluation algorithm can be used as the final result of this risk evaluation. When a plurality of risk evaluation algorithms are selected according to the operation request, calculation can be performed using evaluation results obtained with the plurality of risk evaluation algorithms to obtain a final result of this risk evaluation.

At S400, a determination can be made whether to allow the operation request based on the risk evaluation result. For example, when the risk evaluation result indicates that an operation specification is conformed, the operation request may be allowed, or when the risk evaluation results indicate that there is a risk, the operation request cannot be allowed.

Figure 2:
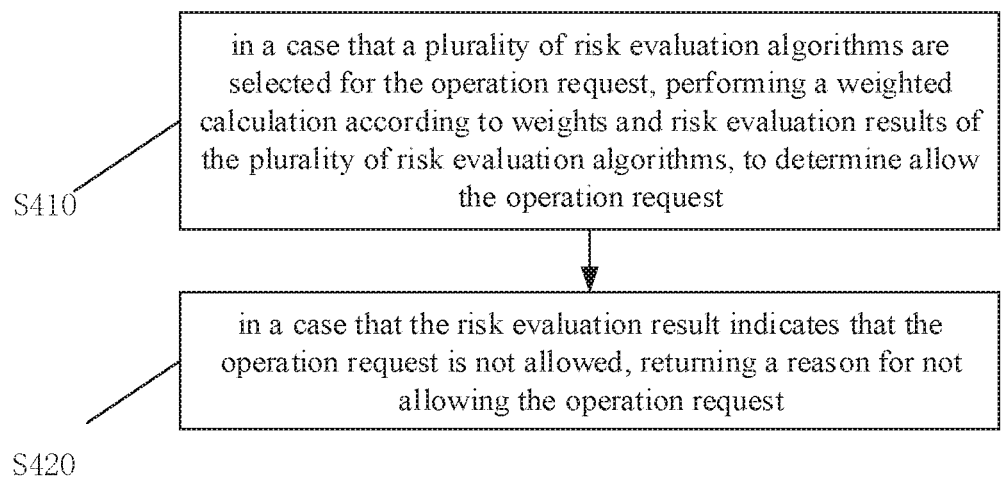
FIG. 2 is a flowchart depicting of a portion of the flowchart of FIG. 1 according to an embodiment of the present disclosure.

FIG. 2 is a flowchart depicting additional portions of S400, that can be performed in embodiments. At S410, when a plurality of risk evaluation algorithms are selected for the operation request, a weighted calculation can be performed according to weights and risk evaluation results of the plurality of risk evaluation algorithms, to determine whether to allow the operation request.

For example, based on the identity of an operator, the operation parameter, and operation object included in the operation request, the authority evaluation algorithm, the speed-limit evaluation algorithm, and the evaluation algorithm for a virtual machine may be selected. Then, according to the three algorithms, corresponding results of 50%, 20% and 60% may be acquired respectively. Further, weighted calculation can be performed according to weights of the three algorithms to acquire the risk evaluation result. For example, in a case that the weights of the three algorithms are 0.3, 0.3 and 0.4 respectively, the result after weighted calculation is 50%*0.3+20%*0.3+60%*0.4=45%. That is, the acquired risk evaluation result is that a probability of a risk is 45%, which is used as a risk coefficient to evaluate the risk of the current operation. Then, it is possible to determine whether to allow the operation request based on a predetermined risk threshold. For example, assuming that a risk threshold of 50% is predetermined, the operation request can determined to be allowed based on the above result of 45% that is less than 50%. On the other hand, assuming that a risk threshold of 40% is predetermined, the result of 45% indicates that the operation request is not allowed.

S420, when the risk evaluation result indicates that the operation request is not allowed, a reason for not allowing the operation request can be returned. In embodiments, such reasons can include insufficient operation authority, input parameters exceeding a predetermined threshold, or the like.

In addition, in an embodiment, a corresponding operation is performed by the instance issuing the operation request based on the returned result and reason and an operation logic can be determined by the instance. For example, after being rejected, the corresponding operation can be directly prevented, the reason preventing the operation can be returned. An approval process can also be initiated automatically, that is, the current operation can be sent to a person with a higher authority for approval, to determine whether to proceed with the operation.

Figure 3:
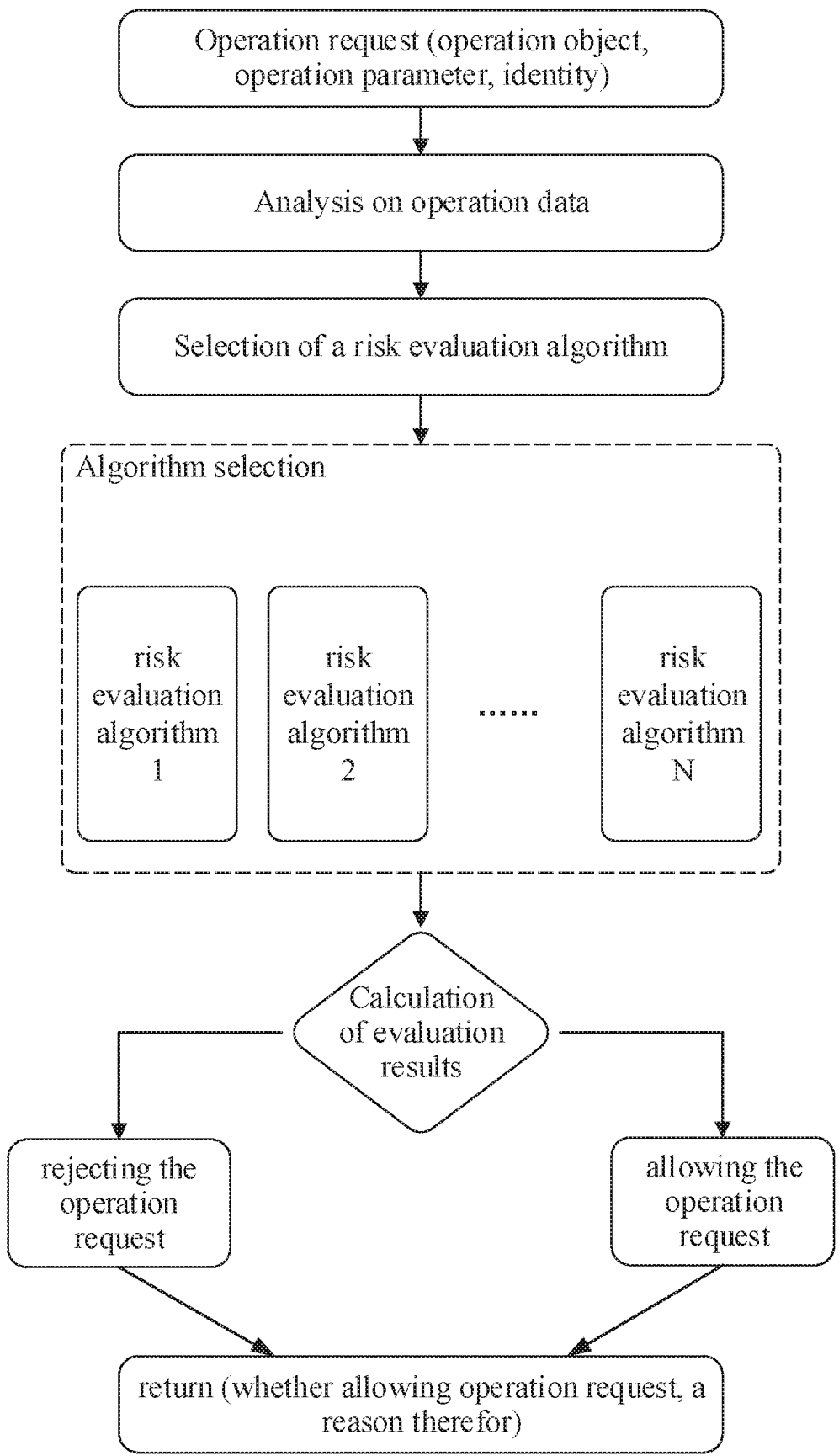
FIG. 3 is a flowchart depicting the overall implementation of an operation defense method according to an embodiment of the present disclosure.

FIG. 3 is a flowchart depicting an operation defense method according to an embodiment of the present disclosure.

In the operation defense method in the embodiments of the present application, a centralized operation defense mechanism is provided, which may be disposed in a server and the operations of the service systems are determined by the server.

An operation request from a business system can be received, including an operation object, a parameter, and an identity of an operator. After analyzing operation data, a risk evaluation algorithm can be selected, such that a result of risk evaluation can be obtained with the selected risk evaluation algorithm. The risk evaluation results acquired by the risk evaluation algorithms can be processed, and a risk evaluation result of being rejected or being allowed and a reason therefor are returned.

Figure 4:
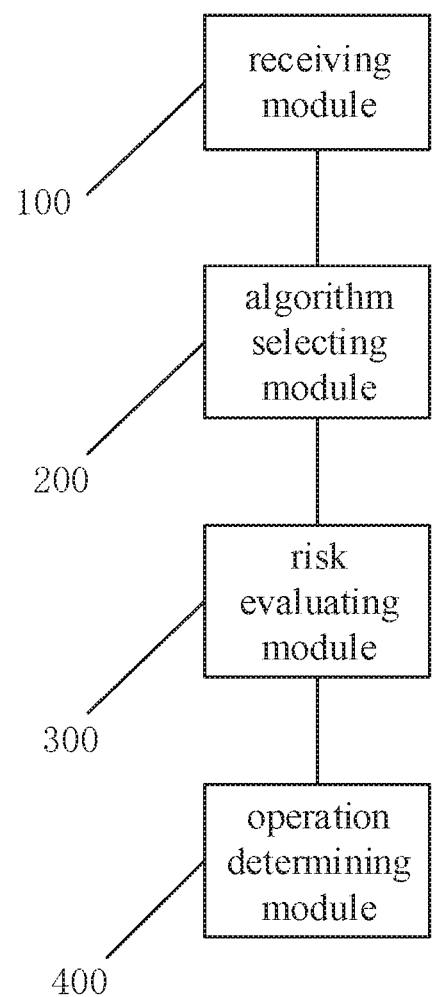
FIG. 4 is a block diagram depicting an operation defense device according to another embodiment of the present disclosure.

In the embodiment of the present application, a centralized operation defense mechanism is used to analyze the operation requests from different service systems and to select an appropriate risk evaluation algorithm to calculate the risk coefficient of each operation request, such that an operation with a high risk can be prevented, and a diffusion range of an abnormality can be reduced, ensuring high availability and stability of a service. FIG. 4 is a schematic diagram depicting an operation defense device according to an embodiment of the present disclosure. The operation defense device can include a receiving module 100, configured to receive an operation request from a business system through a shared interface, an algorithm selecting module 200, configured to, according to a parameter carried in the operation request, select at least one risk evaluation algorithm for the operation request from an algorithm rule library shared by a plurality of service systems, a risk evaluating module 300, configured to perform risk evaluation to the operation request with the selected risk evaluation algorithm and an operation determining module 400, configured to, according to a risk evaluation result, determine to allow the operation request.

Figure 5:
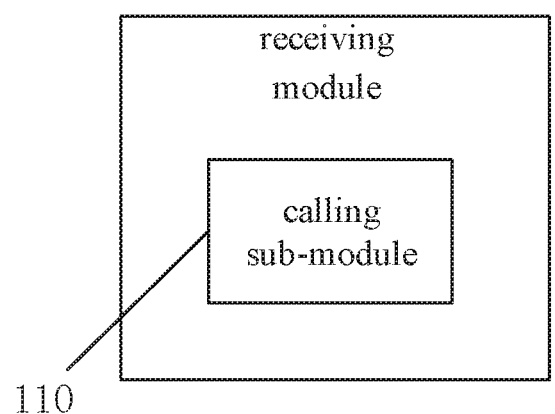
FIG. 5 is an block diagram depicting a receiving module according to another embodiment of the present disclosure.

FIG. 5 is a schematic diagram depicting a receiving module 100, according to an embodiment. The receiving module can include a calling sub-module 110, configured to call an application programming interface of the business system to receive the operation request, the operation request comprising one or more of an operation object, an identity of an operation initiator, and an operation parameter.

The algorithm selecting module 200 can be further configured to select at least one risk evaluation algorithm from the risk evaluation algorithm rule library, according to one or more of the operation object, the identity of the operation initiator, and the operation parameter of the operation request, and in combination with a status of the operation object in the operation request and an operation history of the operation object.

The risk evaluating algorithm can include one or more of an authority evaluation algorithm, a block evaluation algorithm, a quota evaluation algorithm, a speed-limit evaluation algorithm, a service level objection evaluation algorithm, wherein different operation objects corresponds different risk evaluation algorithms.

Figure 6:
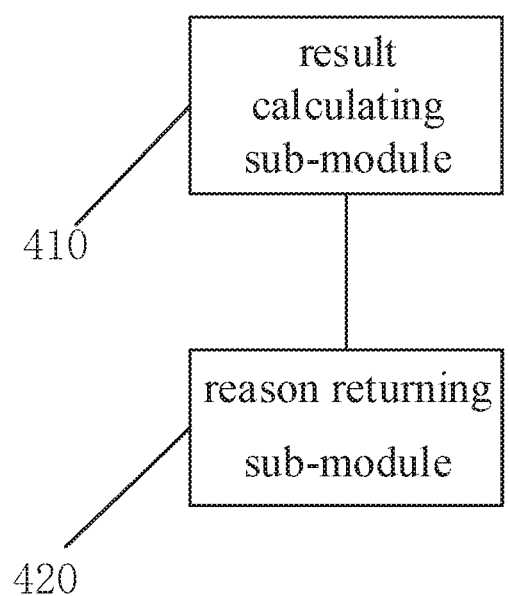
FIG. 6 is an block diagram depicting an operation determining module according to another embodiment of the present disclosure.

FIG. 6 is a schematic diagram depicting an operation determining module 400, according to an embodiment. The operation determining module 400 can include an result calculating sub-module 410, configured to, when a plurality of risk evaluation algorithms are selected for the operation request, perform a weighted calculation according to weights and risk evaluation results of the plurality of risk evaluation algorithms to determine whether to allow the operation request. The operation determining module 400 can include a reason returning sub-module 420, configured to, in a case that the risk evaluation result indicates that the operation request is not allowed, return a reason for not allowing the operation request.

In this embodiment, the functions of the modules in the device correspond to the above-described methods, and thus the description thereof is omitted herein.

Figure 7:
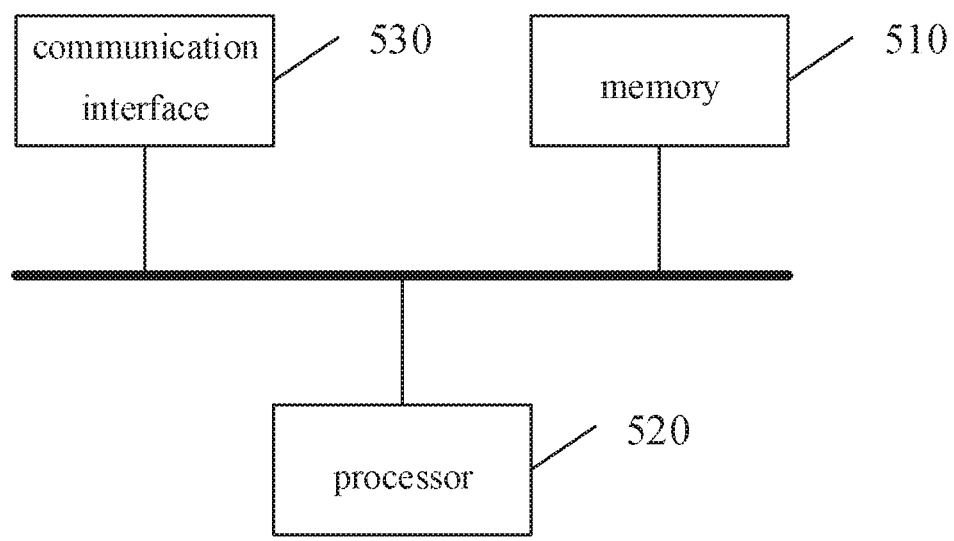
FIG. 7 is a block diagram depicting an operation defense apparatus according to another embodiment of the present disclosure.

FIG. 7 is a schematic diagram depicting components of an operation defense apparatus according to an embodiment. As shown in FIG. 7, the operation defense apparatus includes a memory 510 and a processor 520. The memory 510 stores a computer program executable on the processor 520. When the processor 520 executes the computer program, the operation defense methods described above can be executed. The number of the memory 510 and the processor 520 may be one or more. The operation defense apparatus can further include a communication interface 530 configured to communicate with an external device and exchange data.

The memory 510 may include a high-speed RAM memory and may also include a non-volatile memory, such as at least one magnetic disk memory.

If the memory 510, the processor 520, and the communication interface 530 are implemented independently, the memory 510, the processor 520, and the communication interface 530 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 7, but it does not mean that there is only one bus or one type of bus.

Optionally, in an embodiment, if the memory 510, the processor 520, and the communication interface 530 are integrated on one chip, the memory 510, the processor 520, and the communication interface 530 may implement mutual communication through an internal interface.

According to an embodiment of the present application, a computer-readable storage medium is provided for storing computer software instructions, which include programs involved in execution of the above the method.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in traffic charts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flow charts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically acquire the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. An operation defense method, comprising:
   receiving, by a server or terminal device implemented by circuits, an operation request from a business system through a shared interface, wherein the operation request comprises an identity of an operation initiator which is an operator with a respective permission and a corresponding operation automatically performable by the business system to modify a configuration of an infrastructure, and wherein the type of the operation request comprises a release or a change operation of a program, configuration, and data;
   according to a parameter carried in the operation request, selecting, by the server or terminal device implemented by circuits, at least one risk evaluation algorithm for the operation request from an algorithm rule library shared by a plurality of service systems;
   performing, by the server or terminal device implemented by circuits, risk evaluation to the operation request with the selected risk evaluation algorithm;
   according to a risk evaluation result, determining, by the server or terminal device implemented by circuits, to allow the operation request;
   performing, by the business system, the corresponding operation to modify the configuration of the infrastructure when the operation request is allowed; and
   in a case that the risk evaluation result indicates that the operation request is not allowed, returning, by the server or terminal device implemented by circuits, a reason for not allowing the operation request to the business system.

2. The operation defense method according to claim 1, wherein the receiving, by a server or terminal device implemented by circuits, an operation request from a business system through a shared interface comprises:
   calling, by the server or terminal device implemented by circuits, an application programming interface of the business system to receive the operation request, the operation request further comprising one or more of an operation object and an operation parameter.

3. The operation defense method according to claim 2, wherein the according to a parameter carried in the operation request, selecting, by the server or terminal device implemented by circuits, at least one risk evaluation algorithm for the operation request from an algorithm rule library shared by a plurality of service systems, comprises:
   selecting, by the server or terminal device implemented by circuits, at least one risk evaluation algorithm from the risk evaluation algorithm rule library, according to one or more of the operation object, the identity of the operation initiator, and the operation parameter of the operation request, and in combination with a status of the operation object in the operation request and an operation history of the operation object.

4. The operation defense method according to claim 1, wherein the risk evaluation algorithm comprises one or more of an authority evaluation algorithm, a block evaluation algorithm, a quota evaluation algorithm, a speed-limit evaluation algorithm, a service level objection evaluation algorithm, wherein different operation objects correspond to different risk evaluation algorithms.

5. The operation defense method according to claim 1, wherein the according to a risk evaluation result, determining, by the server or terminal device implemented by circuits, to allow the operation request comprises:
in a case that a plurality of risk evaluation algorithms are selected for the operation request, performing, by the server or terminal device implemented by circuits, a weighted calculation according to weights and risk evaluation results of the plurality of risk evaluation algorithms, to determine allow the operation request.

6. A non-transitory computer-readable storage medium storing computer instructions, wherein the computer instructions cause a computer to perform the method according to claim 1.

7. An operation defense device comprising: one or more processors; and a storage device configured for storing one or more programs, wherein
the one or more programs are executed by the one or more processors to enable the one or more processors to: receive,, an operation request from a business system through a shared interface, wherein the operation request comprises an identity of an operation initiator which is an operator with a respective permission and a corresponding operation automatically performable by the business system to modify a configuration of an infrastructure, and wherein the type of the operation request comprises a release or a change operation of a program, configuration, and data; according to a parameter carried in the operation request, select,, at least one risk evaluation algorithm for the operation request from an algorithm rule library shared by a plurality of service systems; perform,, risk evaluation to the operation request with the selected risk evaluation algorithm; according to a risk evaluation result, determine,, to allow the operation request; perform, by the business system, the corresponding operation to modify the configuration of the infrastructure when the operation request is allowed- and, in a case that the risk evaluation result indicates that the operation request is not allowed, return,, a reason for not allowing the operation request to the business system.

8. The operation defense device according to claim 7, wherein the one or more programs are executed by the one or more processors to enable the one or more processors to: call,, an application programming interface of the business system to receive the operation request, the operation request further comprising one or more of an operation object and an operation parameter.

9. The operation defense device according to claim 8, wherein the one or more programs are executed by the one or more processors to enable the one or more processors to: select,, at least one risk evaluation algorithm from the risk evaluation algorithm rule library, according to one or more of the operation object, the identity of the operation initiator, and the operation parameter of the operation request, and in combination with a status of the operation object in the operation request and an operation history of the operation object.

10. The operation defense device according to claim 7, wherein the risk evaluating algorithm comprises one or more of an authority evaluation algorithm, a block evaluation algorithm, a quota evaluation algorithm, a speed-limit evaluation algorithm, a service level objection evaluation algorithm, wherein different operation objects corresponds different risk evaluation algorithms.

11. The operation defense device according to claim 7, wherein the one or more programs are executed by the one or more processors to enable the one or more processors to: in a case that a plurality of risk evaluation algorithms are selected for the operation request, perform,, a weighted calculation according to weights and risk evaluation results of the plurality of risk evaluation algorithms, to determine allow the operation request.

* * * * *